United States Patent
Shin et al.

(10) Patent No.: US 9,049,439 B2
(45) Date of Patent: Jun. 2, 2015

(54) DISPLAY DEVICE, DISPLAY SYSTEM USING THE SAME AND METHOD FOR PROCESSING IMAGE OF THE DISPLAY DEVICE

(75) Inventors: Kwang-Sub Shin, Yongin (KR); Baek-Woon Lee, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 314 days.

(21) Appl. No.: 13/597,746

(22) Filed: Aug. 29, 2012

(65) Prior Publication Data
US 2013/0222438 A1  Aug. 29, 2013

(30) Foreign Application Priority Data
Feb. 24, 2012  (KR) ........................ 10-2012-0019133

(51) Int. Cl.
| G09G 3/00 | (2006.01) |
| H04N 13/04 | (2006.01) |
| H04N 13/00 | (2006.01) |
| G09G 3/20 | (2006.01) |

(52) U.S. Cl.
CPC ....... H04N 13/0438 (2013.01); H04N 13/0048 (2013.01); *G09G 2358/00* (2013.01); G09G 3/003 (2013.01); G09G 3/2025 (2013.01); *H04N 2013/0463* (2013.01)

(58) Field of Classification Search
CPC .................. H04N 13/0438; H04N 2013/0463; G02B 27/0178; G02B 27/17; G09G 23/58
USPC .......................................... 345/7–8; 359/630
See application file for complete search history.

(56) References Cited

U.S. PATENT DOCUMENTS

| 5,963,371 | A | * | 10/1999 | Needham et al. ............. 359/464 |
| 6,040,876 | A | * | 3/2000 | Pettitt et al. .................... 348/624 |
| 6,529,209 | B1 | * | 3/2003 | Dunn et al. .................... 345/629 |
| 2003/0025667 | A1 | * | 2/2003 | Yerazunis et al. ............ 345/102 |
| 2003/0128218 | A1 | * | 7/2003 | Struyk .......................... 345/581 |
| 2003/0133569 | A1 | * | 7/2003 | Stern et al. .................... 380/206 |
| 2006/0221067 | A1 | * | 10/2006 | Kim et al. ..................... 345/204 |
| 2007/0247392 | A1 | * | 10/2007 | Littrell ............................. 345/8 |
| 2008/0118062 | A1 | * | 5/2008 | Radivojevic et al. ......... 380/210 |
| 2010/0060723 | A1 | * | 3/2010 | Kimura et al. .................. 348/56 |
| 2010/0182407 | A1 | * | 7/2010 | Ko et al. ......................... 348/49 |
| 2010/0182500 | A1 | * | 7/2010 | Ishii et al. ..................... 348/441 |
| 2010/0207954 | A1 | * | 8/2010 | Kim .............................. 345/589 |

(Continued)

FOREIGN PATENT DOCUMENTS

| JP | 2011-007592 A | 1/2011 |
| KR | 10-2004-0086218 A | 10/2004 |

(Continued)

*Primary Examiner* — Dorothy Harris
(74) *Attorney, Agent, or Firm* — Lee & Morse, P.C.

(57) ABSTRACT

A display device includes a display unit including a plurality of pixels connected to a plurality of scan lines and a plurality of data lines, an inverse image processor configured to receive a first image data signal input from an external source and to generate a gray-inverted second image data signal, a controller configured to mix the first image data signal and the second image data signal alternately for each frame to generate a third image data signal, and to generate a driving control signal opening and closing a pair of shutter spectacles for each image frame displayed in the display unit, and a data driver configured to receive the third image data signal from the controller and to apply a corresponding data voltage to each of the plurality of data lines.

27 Claims, 6 Drawing Sheets

(56) References Cited

U.S. PATENT DOCUMENTS

| | | | |
|---|---|---|---|
| 2011/0090233 A1* | 4/2011 | Shahraray et al. | 345/520 |
| 2011/0222559 A1* | 9/2011 | Ishii et al. | 370/498 |
| 2011/0285832 A1* | 11/2011 | Yoon et al. | 348/56 |
| 2012/0057003 A1* | 3/2012 | Ito | 348/56 |
| 2013/0076874 A1* | 3/2013 | Mentz et al. | 348/51 |

FOREIGN PATENT DOCUMENTS

| | | |
|---|---|---|
| WO | WO 2008 026403 A1 | 3/2008 |
| WO | WO 2008 102883 A1 | 8/2008 |

\* cited by examiner

DISPLAY DEVICE, DISPLAY SYSTEM USING THE SAME AND METHOD FOR PROCESSING IMAGE OF THE DISPLAY DEVICE

CROSS-REFERENCE TO RELATED APPLICATION

This application claims priority to and the benefit of Korean Patent Application No. 10-2012-0019133 filed in the Korean Intellectual Property Office on Feb. 24, 2012, the entire contents of which are incorporated herein by reference.

BACKGROUND (a) Field

Example embodiments relate to a display device, a display system using the display device, and an image processing method of the display device. More particularly, example embodiment relate to a display device having a secured image, a display system using the display device, and an image processing method of the display device.

(b) Description of the Related Art

Recently, various flat panel display devices have been developed to reduce weight and volume. Examples of the flat panel display devices include a liquid crystal display (LCD), a field emission display (FED), a plasma display panel (PDP), and an organic light emitting diode (OLED) display, etc. The flat panel display devices widely range from mobile phone terminals representing mobile devices to large-sized display devices installed on the street to be displayed in public.

In general, development and research for the flat panel display devices have been focused on display quality characteristics, e.g., high-definition and high-luminance, to display, e.g., a clear image from any viewing angle. However, development and research for the flat panel display devices have also been focused on protection of information, e.g., private information, secrete information, private data, and the like. That is, security of contents from being seen by unintended individuals, e.g., maintenance of security of displayed contents in a public place.

The above information disclosed in this Background section is only for enhancement of understanding of the background of the invention and therefore it may contain information that does not form the prior art that is already known in this country to a person of ordinary skill in the art.

SUMMARY

Example embodiments have been made in an effort to provide a display device capable of clearly displaying an image to desired users, while protecting private image content from non-users, a system, and a secured image processing method of the display device.

Example embodiments introduce a new display method and device providing security, e.g., privacy, by displaying an image for transmission of information only to a user who needs to recognize the image, without using a complicated device or facility, thereby providing convenience to the actual user in recognition of a secured image.

A display device according to an exemplary embodiment includes: a display unit including a plurality pixels connected to a plurality of scan lines and a plurality of data lines; an inverse image processor receiving a first image data signal input from an external source to generate a gray-inverted second image data signal; a controller generating a third image data signal mixing the first image data signal and the second image data signal alternately for each frame, and generating a driving control signal of a pair of shutter spectacles opened and closed for each image frame displayed in the display unit; and a data driver receiving the third image data signal from the controller and applying a data voltage corresponding to each of the plurality of data lines.

The inverse image processor includes a gray inverter calculating an inverse luminance value having an inverse gray corresponding to a luminance value of the first image data signal and converting luminance information of the first image data signal.

The sum of the luminance value and the inverse luminance value represents a luminance value of the maximum gray determined according to a number of bits representing a data value of the first image data signal.

The inverse image processor may further include at least one of a DC component adding unit adding or subtracting a luminance DC component with respected to a gray-inverted image data signal and a noise generator generating and adding a noise signal with respect to the gray-inverted image data signal.

The DC component adding unit may further add a luminance component that reduces a luminance difference of a data signal corresponding to an edge interface of an object in a displayed image among the image data signal with reference to the edge.

In addition, the noise generator may further generate and add luminance noise that reduces a luminance difference of a data signal corresponding to an edge interface of an object in a displayed image among the image data signal with reference to the edge.

The controller may include a data processor alternately mixing the first image data signal and the second image data signal by each frame unit, generating the third image data signal, and transmitting the third image data signal to the data driver.

In this case, the data processor may perform dithering to reduce a luminance difference of a data signal corresponding to an edge interface of an object in a displayed image among the second image data signal with reference to the edge.

The controller may include a pair of shutter spectacles controller generating and transmitting a driving control signal of the shutter spectacles to the shutter spectacles, the driving control signal opening the shutter spectacles for a frame during which a first image according to the first image data signal among the displayed image according to the third image data signal is displayed and closing the shutter spectacles for a frame during which a second image according to the second image data signal among the displayed image according to the third image data signal is displayed.

As an exemplary embodiment, the first image data signal and the second image data signal may respectively include a first view-point image data signal and a second view-point image data signal. The third image data signal is formed by arranging sequentially mixed a second image data signal of a first view point, a first image data signal of the view point, a first image data signal of a second view point, and a second image data signal of the second view point, and an image displayed according to the arrangement is a stereoscopic image.

The controller of the display unit may generate a driving control signal of the shutter spectacles to open a left-eye shutter of the shutter spectacles while an image according to the first image data signal of the first view-point is displayed and to close a right-eye shutter of the shutter spectacles while an image according to the first image data signal of the second view point is displayed.

The driving control signal of the shutter spectacles may include: a left-eye shutter control signal for opening the left-eye shutter of the shutter spectacles while the image according to the first image data signal of the first view-point is displayed; and a right-eye shutter control signal for opening the right-eye shutter of the shutter spectacles while an image according to the first image data signal of the second view-point is displayed.

In this case, the driving control signal of the shutter spectacles closes the left-eye shutter and the right-eye shutter of the spectacles while images according to the second image data signal of the first view-point and the second image data signal of the second view-point are displayed.

The controller may include a timing controller generating and transmitting a control signal that controls driving of the display unit and the data driver according to a synchronization signal input from an external source.

A display system according to another exemplary embodiment includes: a data processor generating a third image data signal formed by alternately mixing a first image data signal and a second image data signal, the second image signal formed by receiving the first image data signal input from an external source and inverting a gray thereof; a display unit including a plurality of pixels displaying an image by emitting light with a driving current corresponding to the third image data signal; a pair of shutter spectacles opened and closed by each image frame unit displayed in the display unit to control transmission of the displayed image; and a shutter spectacle controller generating a driving control signal controlling opening and closing of the shutter spectacles and transmitting the driving control signal to the shutter spectacles.

The display system may further include an inverse image processor receiving the first image data signal and generating the second image data signal by inverting a gray of the first image data signal.

The driving control signal may open the shutter spectacles for a frame during a first image according to the first image data signal among the displayed image according to the third image data signal is displayed and may close the shutter spectacles for a frame during which a second image according to the second image data signal among the displayed image according to the third image data signal is displayed.

As another exemplary embodiment, the first image data signal and the second image data signal may respectively include a first view-point image data signal and a second view-point image data signal, the third image data signal may include a first image data signal of the first view-point, a second image data signal of the first view-point, a first image data signal of the second view-point, and a second image data signal of the second view-point, the signals being sequentially mixed, and the shutter spectacles controller may open a left-eye shutter of the shutter spectacles while an image according to the first image data signal of the first view-point is displayed and open a right-eye shutter of the shutter spectacles while an image according to the first image data signal of the second view-point is displayed. Such a display system realizes a stereoscopic image.

In this case, the driving control signal of the shutter spectacles may include a left-eye shutter control signal opening the left-eye shutter of the shutter spectacles while an image according to the first image data signal of the first view-point is displayed and a right-eye shutter control signal opening the right-eye shutter of the shutter spectacles while an image according to the first image data signal of the second view-point is displayed.

The driving control signal of the shutter spectacles may close the left-eye shutter and the right-eye shutter of the shutter spectacles while images according to the second image data signal of the first view-point and the second image data signal of the second view-point are displayed.

An image processing method of a display device according to example embodiments includes: receiving a first image data signal from an external source; receiving the first image data signal and generating a second image data signal by inverting a gray of the first image data signal; detecting a data signal corresponding to an edge interface of an object in a displayed image in the second image data signal and performing dithering to reduce a luminance deviation of the data signals with reference to the edge; generating a third image data signal by alternately mixing the first image data signal and the second image data signal by each frame unit; and outputting the third image data signal to a plurality of pixels of the display unit to display the corresponding image.

The gray-inverted second image data signal may be generated by calculating an inverse luminance value having an inverted gray corresponding to the first image data signal and converting luminance information of the first image data signal.

After the generating the gray-inverted second image data signal, at least one of adding and subtracting a luminance DC component with respect to the gray-inverted second image data signal and generating and adding a noise signal with respect to the gray-inverted second image data signal may be further performed.

The first image data signal and the second image data signal may respectively include a first view-point image data signal and a second view-point image data signal, and the third image data signal may be formed by arranging sequentially mixed a second image data signal of a first view point, a first image data signal of the view point, a first image data signal of a second view point, and a second image data signal of the second view point such that the display device can realize a stereoscopic image.

DETAILED DESCRIPTION OF THE EMBODIMENTS

Figure 1:
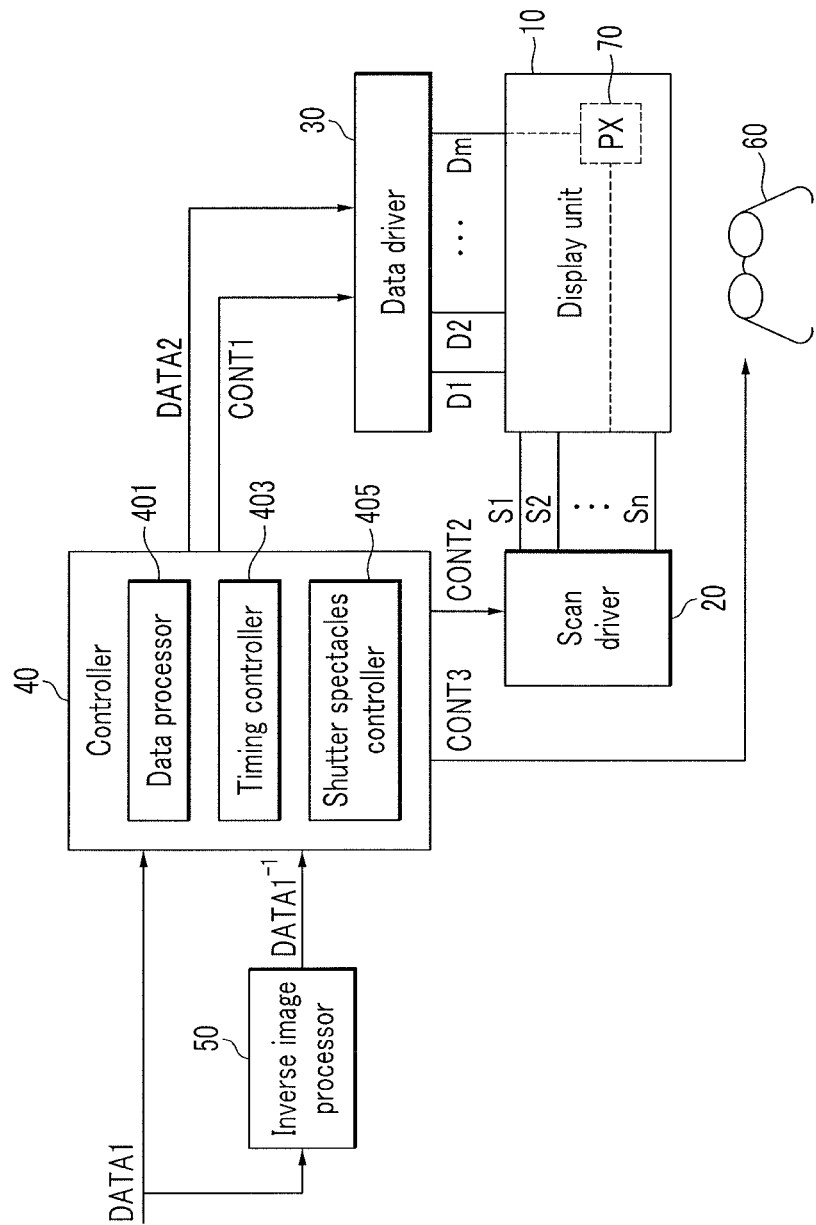
FIG. 1 is a block diagram of a display device and a display system according to an exemplary embodiment.

Example embodiments will be described more fully hereinafter with reference to the accompanying drawings, in which the exemplary embodiments are shown. As those skilled in the art would realize, the described embodiments may be modified in various different ways, all without departing from the spirit or scope of the inventive concept.

The drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

FIG. 1 is a block diagram of a display device and a display system according to an exemplary embodiment.

Referring to FIG. 1, a display device according to an exemplary embodiment includes a display unit 10 including a plurality of pixels 70, a scan driver 20 connected with the plurality of pixels 70 through a plurality of scan lines S1 to Sn, a data driver 30 connected with the plurality of pixels 70 through a plurality of data lines D1 to Dm, a controller 40 controlling external shutter spectacles 60, the scan driver 20, and the data driver 30, and an inverse image processor 50 generating an inverse image with respect to an external image data and transmitting the generated inverse image to the controller 40.

The display system including the display device according to the exemplary embodiment of FIG. 1 includes the shutter spectacles 60 that enable a user to receive an image generated from the display unit 10 and recognize the image.

Configurations of the display device and the display system, shown in FIG. 1 are one exemplary embodiment, but are not limited thereto. Therefore, embodiments can be expanded, resized, or re-modified in the spirit and essential characteristics of the inventive scope.

In further detail, the display unit 10 of FIG. 1 includes a plurality of pixels 70 arranged in row and column directions, forming a matrix structure. Driving of each of the plurality of pixels 70 is activated by a corresponding scan signal transmitted from the scan driver 20, and a light emission element emits light with a driving current according to a corresponding data signal transmitted from the data driver 30, such that an image is displayed.

Although it is not shown in FIG. 1, the display unit 10 receives a first power source voltage ELVDD and a second power source voltage ELVSS from an external source and supplies the received voltages to the respective pixels 70. The first power source voltage ELVDD and the second power source voltage ELVSS respectively control a current flowing to the second power source via the light emission element from the first power source corresponding to the data signal transmitted from the data driver 30, such that light corresponding to the data signal is generated. In the present exemplary embodiment, the plurality of data signals transmitted through the data driver are image data signals respectively secured for protection of a displayed image and processed together with an original image.

The scan driver 20 receives a scan driving control signal CONT2 from the controller 40 and generates a plurality of scan signals. The scan driver 20 sequentially supplies the plurality of scan signals to the plurality of scan lines S1 to Sn, respectively.

The data driver 30 receives a data driving control signal CONT1 from the controller 40, and transmits a plurality of data signals DATA2 corresponding to the processed image from the controller 40 to the respective pixels of the display unit 10. That is, the data driver 30 supplies the processed data signal DATA2 to the plurality of data lines D1 to Dm for synchronization with the scan signals.

The controller 40 receives the synchronization signals supplied from an external source, a clock signal, and image data to generate and process control signals for controlling driving of the respective drivers of the display device and data signals output to the data driver. The controller 40 according to the exemplary embodiment of FIG. 1 may include a data processor 401, a timing controller 403, and a shutter spectacles controller 405.

In detail, the data processor 401 receives the original image data signal DATA1 input from the external source and an inverse image data signal $DATA1^{-1}$, i.e., generated by converting the original image data $DATA^1$, in the inverse image processor 50, processes the received signals, and outputs the processed signals as a security image data signal DATA2 for security of the displayed image to the data driver 30.

The inverse image data signal $DATA1^{-1}$ generated from the inverse image processor 50 using the original image data signal DATA1 input from the external source and a conversion processing method for performing the same will be described in further detail with reference to FIG. 2.

The data processor 401 of the controller 40 generates the security image data signal DATA2 by receiving the externally input original image data signal DATA1 and, at the same time, receiving the inverse image data signal $DATA1^{-1}$ generated from the inverse image processor 50, and the data driver 30 transmits the security image data signal DATA2 to the respective pixels of the display unit 10, such that the respective pixels emit light with a driving current according to the security image data signal DATA2 for displaying an image. In this case, the displayed image is an image where the original image data and the inverse image data are mixed during consecutive frames, and a user (i.e., a viewer) of the display device can recognize an actual image, i.e., the original image, only through the shutter spectacles 60. That is, only a person wearing the shutter spectacles 60 may view the original image by selectively recognizing the actual original image included in the consecutive frames, while unintended viewers, i.e., without the shutter spectacles 60, view a secured image, i.e., the mixed image of the original image and the inverse image. The mixed image includes the original image and the inverse image, so viewers without the shutter spectacles 60 cannot distinguish the actual original image so that security, e.g., privacy, of the contents of the original image can be assured.

Meanwhile, according to another embodiment, the data processor 401 can detect data of an edge interface of an object displayed in the image before or after processing of the received original image data signal DATA1 and the inverse image data signal $DATA1^{-1}$. The edge portion of the object in the displayed image cannot be easily hidden by the inverse image, and therefore dithering can be performed by detecting a data signal with respect to the edge interface portion.

Although the inverse image data signal $DATA1^{-1}$ is converted in the inverse image processor 50 by adding a luminance DC component or generating a noise signal for the edge portion, the data driver 401 additionally performs dithering so as to further reduce a luminance difference in the edge portion. Then, the inverse image can thoroughly mask the original image so that security of the image can be maximized.

The original image data signal DATA1, inverse image data signal $DATA1^{-1}$, and the secured image data signal DATA2 may be 2-dimensional image data signals including optical characteristic information, e.g., color and luminance information. However, they may be 3-dimensional stereoscopic image data signals for a user to recognize a 3-dimensional stereoscopic image.

The timing controller 403 of the controller 40 controls driving timing of the respective drivers of the display device based on a synchronization signal and a clock signal that are input from an external source. The synchronization signal may be a vertical synchronization signal Vsync (not shown) that divides consecutive frames and a horizontal synchronization signal Hsync that sets a driving activation timing for each of the pixels included in a pixel line. The timing controller 403 can generate the data driving control signal CONT1 and the scan driving control signal CONT2 corresponding to the synchronization signals. In addition, although it is not shown, the timing controller 403 may generate a power source driving control signal that controls supply of a power source voltage supplied from the first and second power sources. The data signals and the scan signals are sequentially transmitted to the respective data and scan lines corresponding to the driving timing of the data driving control signal CONT1 and the scan driving control signal CONT2.

Further, the shutter spectacles controller 405 of the controller 40 generates and transmits a shutter spectacles control signal CONT3 that controls opening/closing of the shutter spectacles 60 for recognition of an image displayed in the display unit from an outside of the display unit. The left-eye shutter and the right-eye shutter may be simultaneously opened and closed or they may be alternately opened and closed according to a driving method of the image displayed in the display unit 10. In the example embodiments, an actual image displayed in the display unit 10 and a secured image that is formed to prevent the actual image from being viewed are distinctively transmitted to a user and another person, respectively, and the shutter spectacles 60 enable transmission of the actual image to the user. That is, a user who desires to view an original image of a content to be protected wears the shutter spectacles 60 to selectively view the original image within the secured image transmitted from the display unit 10. However, another person who is not authorized to view the content cannot view the original image within a secured image when viewing the secured image displayed from the display unit without the shutter spectacles 60.

Both of the left-eye and right-eye shutters may be opened and closed or they may be separately opened and closed for the user to selectively view the actual original image in the secured image, and the shutter spectacles control signal CONT3 controls opening and closing of the shutter spectacles 60 according to a driving method of the secured image displayed in the display unit 10.

Figure 2:
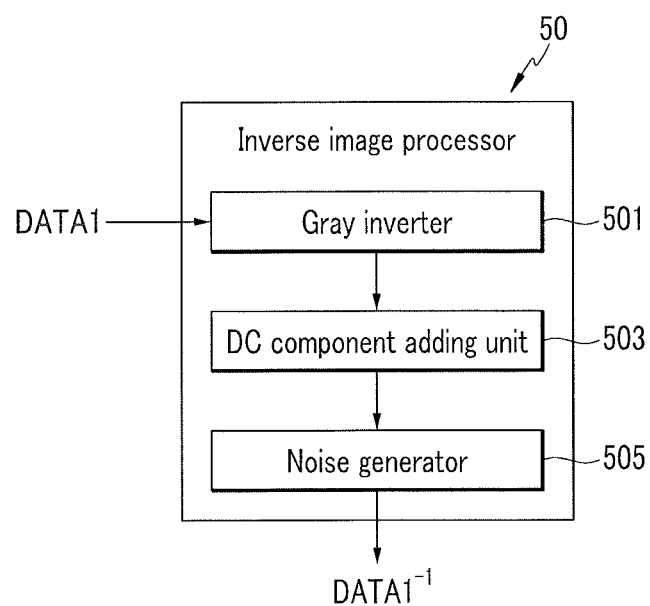
FIG. 2 is a block diagram of a configuration of an inverse image processor of FIG. 1 according to an exemplary embodiment.

FIG. 2 is a block diagram of a configuration of the inverse image processor 50 according to the exemplary embodiment shown in FIG. 1.

The inverse image processor 50 converts the original image data signal DATA1 input from an external source to an inverse image data signal DATA1' through a predetermined signal process and outputs the inverse image data signal DATA1. Through the predetermined signal process, optical characteristic data of the original image, such as luminance is changed.

According to the exemplary embodiment, the predetermined signal process may be a gray inverse process, a DC component addition process, or a noise generation and addition process, but embodiments are not limited thereto. Any signal process for modification of the original image for protection and confidentiality of the original image can be applicable to the predetermined signal process.

Referring to FIG. 2, the inverse image processor 50 includes a gray inverter 501, a DC component adding unit 503, and a noise generator 505. In FIG. 2, the gray inverter 501, the DC component adding unit 503, and the noise generator 505 are sequentially arranged, but connection and arrangement of the constituent elements may be changed according to a different signal processing order.

The gray inverter 501 receives the original image data signal DATA1, acquires luminance information of the corresponding data, and inverts the luminance value. That is, the gray inverter 501 converts a pixel-specific input data value that indicates luminance information of the original image data signal DATA1 into a luminance value. Here, the pixel-specific input data value can be represented with 8 to 12 bits. In addition, the gray inverter 501 calculates an inverse luminance value having an inverted gray corresponding to the corresponding luminance value. Thus, a contrast ratio in light emission with luminance of the corresponding data can be symmetrically adjusted within the entire gray range. The sum of the luminance value and the inverse luminance value represents a luminance value of the maximum gray (i.e. 256) determined according to a number of bits (e.g., 8 bits) that represents a data value of the input original data signal.

The calculation of the inverse luminance value corresponds to modification of a gray value so that a luminance of the output data signal having the gray inverted through the gray inverter 501 and a luminance of the input original image data signal have opposite contrast ratios to each other.

When the input image data signal has 8-bit gamma data, entire grays that can be represented with the data signals are 28 (i.e., 56 grayscale), and the entire gray range becomes 0 to 255. Within the entire gray range, a gray of the input original image data signal DATA1 is inverted. That is, the sum of the gray of the input original image data signal DATA1 and the gray of the inverse image data signal becomes 256 gray through the inversion. For example, if luminance of the original image data signal DATA1 is as low as about 36 gray, the low gray data is changed to high gray data of 220 gray which can be obtained by subtracting 36 gray from 256 gray through the inversion. When luminance information is high-gray data of about 200, the high gray is converted to low-gray data of 56. The inverse image displayed by an output data signal that gray-inverted the original image data signal DATA1 has an inverse contrast configuration compared to the original image.

The image data signal of which a gray is symmetrically inverted in the gray inverter 501 is transmitted to the DC component adding unit 503.

The DC component adding unit 503 adds a luminance component as a DC component to the transmitted image data signal of which the gray is inverted so as to eliminate a luminance difference between objects included in the entire displayed image. The luminance components may be a reference luminance value (i.e., a constant), and addition of the luminance component implies a concept of a process for adding or subtracting the reference luminance value.

An inverse image displayed by the inverse image data signal output through data conversion process of the inverse image processor 50 is mixed with the original image that is actually input from an external source and then processed as a secured image. When the secured image is displayed, the original image and the inverse image appear to be overlapped to a viewer without the shutter spectacles 60. In this case, an object or an edge portion of an object displayed in the image is particularly well viewed. Thus, the DC component adding unit 503 may add the luminance DC component to reduce a luminance difference with respect to the edge interface in generation of the inverse image data signal $DATA1^{-1}$. A luminance value of the added luminance DC component may be any luminance value that can reduce a luminance difference ratio with respect to the edge interface.

For example, when a left luminance value is 100 nit and a right luminance value is 101 nit with respect to the edge interface of a predetermined object in the displayed image, e.g., when a luminance difference is about 1%, the DC component adding unit 503 adds a luminance value of 100 nit as the DC component to the data signal formed by inverting a gray of an original image data signal of the corresponding portion to convert the signal. Then, the data luminance values of the corresponding portion become 200 nit and 201 nit, such that the luminance difference in the edge interface may be reduced to 0.5%.

According to the exemplary embodiment of the present invention, the inverse image displayed by the data signal output after signal processing performed by the DC component adding unit 503 reduces the luminance difference in the edge portion of the object so that the interface cannot be distinctive, and accordingly security to cover the original image can be further improved.

A luminance value calculated after adding a reference luminance value in the DC component adding unit 503 is re-converted to a data value.

Referring to FIG. 2, an image data signal including a data value re-converted to a luminance value experienced modulation after being added the DC component is transmitted to the noise generator 505. The noise generator 505 generates a noise signal for optical characteristic information depending on image quality of a displayed image, e.g., luminance, chromatic aberration, contrast, and the like, and adds the generated noise signal. That is, the noise generator 505 may generate luminance noise and color noise with respect to the data signal converted by the DC component adding unit 503 and may add the generated luminance noise and color noise. In addition, a control value to set a noise threshold value of a luminance or color component and a control value to control contrast with respect to a data signal may be set in image data processing for realization of clear image quality. In example embodiments, a luminance noise threshold value, a color noise threshold voltage, and a contrast control value may be set in the noise generator 505 to effectively form an inverse image that covers the original image.

Further, the noise generator 505 may generate and add a luminance noise to an image data signal corresponding to an edge interface with respect to an object of a displayed image to eliminate a luminance deviation in the edge interface, in addition to the noise signal with respect to the entire image data. Once a process for converting the image data signal is performed in the noise generator 505, the original image data signal DATA1 input to the inverse image processor 50 is output as an inverse image data signal DATA1$^{-1}$ having an inverted gray, having no luminance deviation in the edge interface of the object, and having an added noise and DC component.

Figure 3:
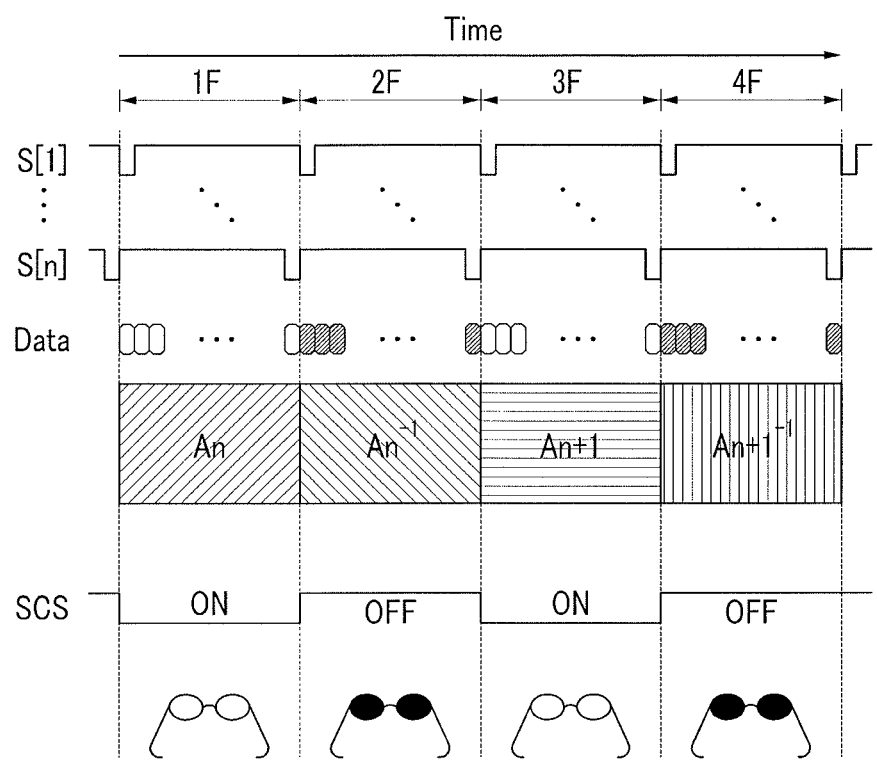
FIG. 3 is a timing diagram and a schematic view of the display device and the display system according to the exemplary embodiment.

FIG. 3 shows timing and a concept of the display device and an image processing method of the display system according to the exemplary embodiment.

Referring to the timing diagram of FIG. 3, respective frames F1 to F4 are sequentially provided according to a time flow.

During each frame, the entire pixels of the display unit 10 are sequentially activated. That is, driving of the plurality of pixels respectively corresponding to the plurality of pixel lines are activated by being synchronized at a time of application of voltage values that depend on on-voltage levels of the plurality of scan signals S[1] to S[n] that are respectively transmitted to the plurality of scan lines connected to the plurality of pixel lines. In this case, the on-voltage level indicates a voltage level that turns on a transistor of the corresponding pixel. In FIG. 3, a constituent element of the pixel is a P channel metal oxide semiconductor (PMOS) transistor, and therefore the on-voltage level may be a predetermined low-level voltage that can turn on the PMOS transistor.

When the plurality of scan signals S[1] to S[n] are iteratively transmitted to the respective frames 1F to 4F, a data voltage according to a data signal is applied to a plurality of pixels included in each pixel line in response to a voltage pulse of an on-voltage level. That is, an image data signal, i.e., a secured image data signal DATA2 output through the data driver 30 by the controller 40, is sequentially transmitted to the plurality of pixels corresponding to each pixel line such that image data is written in the pixels.

In this case, as previously described, the secured image data signal written in the pixel corresponds to a signal formed by mixing the inverse image data signal DATA$^{-1}$ modulated by the inverse image processor 50 of FIG. 2 and the actual original image data signal DATA1 in the data processor 401 of the controller 40.

The data processor 401 of the controller 40 according to the exemplary embodiment of FIG. 3 may process and output the original image data signal DATA1 and the inverse image data signal DATA1$^{-1}$ to be alternate for each frame unit.

Thus, as shown in FIG. 3, an image according to the processed secured image data may be displayed as An, i.e., an original image, in the first frame F1, An$^-$, i.e., an inverse image of the original image An, in the second frame F2, An+1, i.e., an original image continued to the next frame of the original image An, in the third frame F3, and An+1, i.e., an inverse image of the original image An+1 in the fourth frame F4.

For better understanding and ease of description, the inverse images of the original images respectively have lines in different direction in FIG. 3. For example, images in the first and second frames have oblique lines in opposite directions and images in the third and fourth frames have vertical and horizontal lines, respectively.

In the consecutive frames, the original image and the inverse image are sequentially continued and accordingly the shutter spectacles 60 are opened and closed and a shutter control signal SCS is generated and transmitted for controlling opening and closing of the shutter spectacles 60. As described in FIG. 1, the shutter control signal SCS is generated in the shutter spectacle controller 405 of the controller 40 and is transmitted to the shutter spectacles 60. The shutter control signal SCS is transmitted as an on level voltage that opens the shutter spectacles only when the original image is displayed among secured images displayed corresponding to the secured image data signal. That is, the shutter control signal SCS is transmitted as an on level voltage that opens the shutter spectacles 60 only for a frame during which the original image data signal included in the secured image data signal is transmitted.

In the first frame 1F, the shutter control signal SCS is transmitted as the on-voltage level, and accordingly the left-eye shutter and the right-eye shutter are both turned on. Then, the user can view the original image An of the first frame F1 displayed in the display unit through the shutter spectacles 60. Then, in the second frame F2, the shutter control signal SCS is transmitted as an off-voltage level, and accordingly the left-eye shutter and the right-eye shutter of the shutter spectacles 60 are both turned off. Then, the user cannot view the inverse image An−1 of the original image An displayed during the second frame F2 because the shutter spectacles 60 is closed. Thus, the user can view the original image displayed only when the shutter spectacles 60 is opened in the consecutively continued secured frames of the secured image, and image recognition of the inverse images is blocked by the shutter spectacles 60. The user can clearly view the original images by opening and closing the shutter spectacles 60 even though the secured image is displayed. However, other users who do not wear the shutter spectacles 60 view the secured images of the consecutively displayed original images and the inverse images, e.g., simultaneously, so that they cannot view the original image due to visual overlapping effect of two image data respectively having opposite grays.

Figure 4:
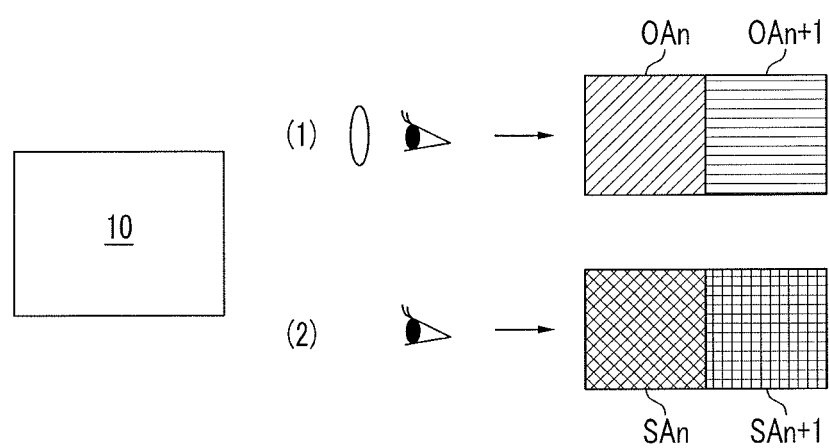
FIG. 4 is a schematic view of an image pattern recognized depending on the display system according to the exemplary embodiment.

FIG. 4 schematically shows an image pattern recognized according to the image display system of the present exemplary embodiment.

In FIG. 4, exemplary embodiment (1) shows image recognition of a user wearing the shutter spectacles 60, and exemplary embodiment (2) shows image recognition of a user viewing the display unit 10 without the shutter spectacles 60.

The user of the exemplary embodiment 1 sequentially recognizes original images OAn and OAn+1 being synchronized and displayed among secured images when the shutter spectacles 60 are opened, and views an original image.

On the contrary, the user of the exemplary embodiment 2, who is not wearing the shutter spectacles 60, sequentially recognizes all of the original image and inverse image, and the original image and the inverse image of the consecutive frames are visually overlapped such that they are viewed as the secured images San and SAn+1. Thus, others who do not wear the shutter spectacles 60 cannot view the original images OAn and OAn+1, so that the private information with respect to the original images can be protected.

Figure 5:
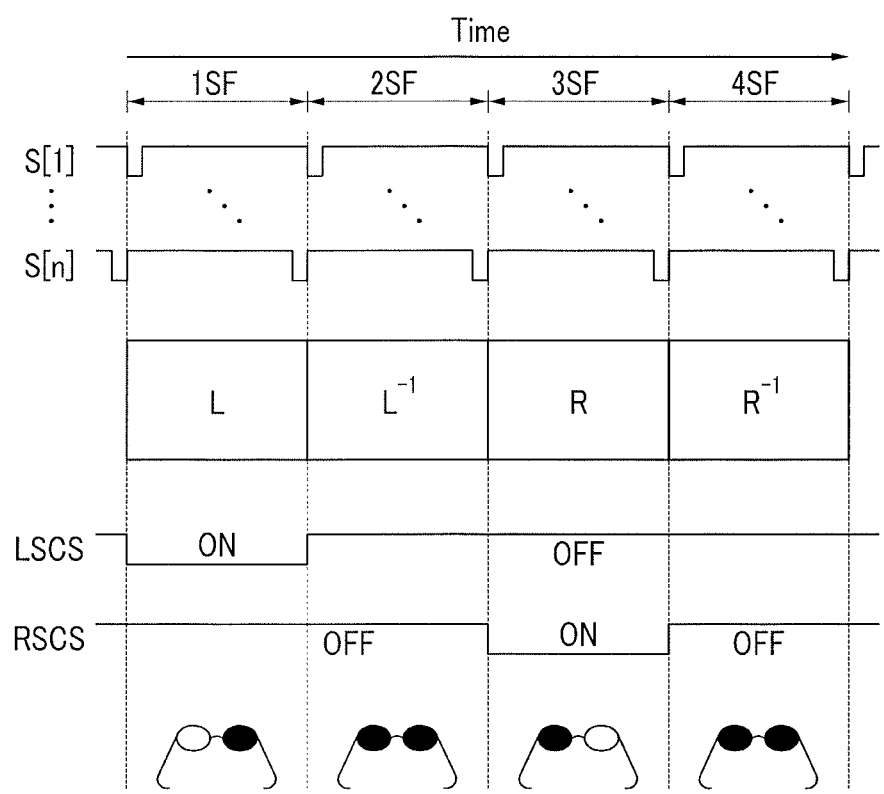
FIG. 5 is a timing diagram and a schematic view of a display device and a display system according to another exemplary embodiment.

FIG. 5 shows timing and a concept of a display device and an image processing method of a display system according to another exemplary embodiment.

FIG. 5 is an exemplary embodiment that alternately displays original images and inverse images for each frame unit for consecutive frames like FIG. 3. However, the exemplary embodiment of FIG. 5 is driving of 3-dimensional image data, unlike the driving of the 2-dimensional image data. That is, the input original image data signal is 3-dimensional stereoscopic image data including a left-eye image data signal and a right-eye image data signal. Thus, the inverse image processor 50 of FIG. 2 outputs a left-eye image data signal and a right-eye image data signal of the original image as an inverse left-eye image data signal and an inverse right-eye image data signal through gray inversion, DC luminance component addition, and noise generation and addition processes.

Then, the data processor 401 of the controller 40 generates and outputs a secured stereoscopic image data signal, and the secured stereoscopic image data signal is formed by mixing and processing the respective image data signals so as to sequentially display an original image L of a left-eye image, an inverse image $L^{-1}$ of the left-eye image, an original image R of a right-eye image, and an inverse image $R^{-1}$ of the right-eye image as shown in FIG. 5.

According to the exemplary embodiment, the original image L of the left-eye image, the inverse image $L^{-1}$ of the left-eye image, the original image R of the right-eye image, and the inverse image $R^{-1}$ of the right-eye image may be displayed after a data signal is transmitted and written for each subfield unit (1SF to 4SF) during one frame. Alternatively, the left-eye original image, the left-eye inverse image, the right-eye original image, and the right-eye inverse image may be alternately displayed for each frame according to another exemplary embodiment.

When the stereoscopic image data signals displayed in the display unit 10 are written according to the method shown in FIG. 5 and then images are realized, shutter control signals are transmitted for each displayed image unit to control opening and closing of the shutter spectacles 60. Since the exemplary embodiment of FIG. 5 is a method for realizing a stereoscopic image, the left-eye shutter and the right-eye shutter of the shutter spectacles 60 are individually opened and closed and control signals for controlling the respective shutters may be individually generated as a left-eye shutter control signal LSCS and a right-eye shutter control signal RSCS. The left-eye shutter control signal LSCS and the right-eye shutter control signal RSCS are generated in the shutter spectacles controller 405 of the controller 40 and then transmitted.

Referring to FIG. 5, secured stereoscopic image data signals are written in each sub-field unit and then images are displayed. That is, in the first subfield 1SF, a left-eye original image data signal among the secured stereoscopic image data signals is synchronized at a transmission time point of the scan signals S[1] to S[n] and thus applied to each pixel, and then the left-eye original image L is displayed in the display unit 10. In the second subfield 2SF, a left-eye inverse image data signal formed by modulating the right-eye original image data signal is synchronized at the transmission time point of the scan signals S[1] to S[n] and then applied to each pixel, and then the left-eye inverse image $L^{-1}$ of the left-eye original image signal L is displayed in the display unit 10. In the third and fourth subfields 3SF and 4SF, the right-eye original image data signal and the right-eye inverse image data signal are respectively transmitted using the same method as described above such that the right-eye original image R and the right-eye inverse image R− are respectively displayed.

In the first subfield 1SF, the left-eye shutter control signal LSCS is transmitted as an on-voltage level and accordingly the left-eye shutter of the shutter spectacles 60 is turned on. Then, a user can view the left-eye original image L through the left-eye shutter spectacles. In the second subfield 2SF, since the left-eye shutter control signal LSCS is transmitted as an off-voltage level, the left shutter of the shutter spectacles 60 is closed so that the shutter spectacles 60 is closed. Then, the user cannot view the left-eye inverse image $L^{-1}$ displayed during the second subfield 2SF. The left-eye shutter control signal LSCS is transmitted as the off-voltage level during other sub-fields than the first sub-field 1SF during which the left-eye original image L is displayed.

In the third subfield 3SF, the right-eye shutter control signal RSCS is transmitted as an on-voltage level, and accordingly the right-eye shutter of the shutter spectacles 60 is turned on. Then, the user can view the right-eye original image R through the right-eye shutter spectacles. In the fourth subfield 4SF, the right-eye shutter control signal RSCS is transmitted as an off-voltage level, and therefore the right-eye shutter of the shutter spectacles 60 is closed so that the shutter spectacles 60 is closed. Then, the user cannot view the right-eye inverse image $R^{-1}$ displayed during the fourth subfield 4SF. The right-eye shutter control signal RSCS is transmitted as the off-voltage level during other subfields than the third subfield 3SF during which the right-eye original image R is displayed.

Thus, the user can recognize a 3-dimensional stereoscopic image by viewing left-eye and right-eye original images displayed during the first and third sub-fields, during which the left-eye shutter and the right-eye shutter are respectively opened in the consecutively displayed secured stereoscopic image, and recognition of the left-eye and right-eye inverse images is blocked because the shutter spectacles 60 are closed in the rest of the sub-fields. With the method of FIG. 5, the user can assure security of image contents from other person in a 3-dimensional stereoscopic image.

Figure 6:
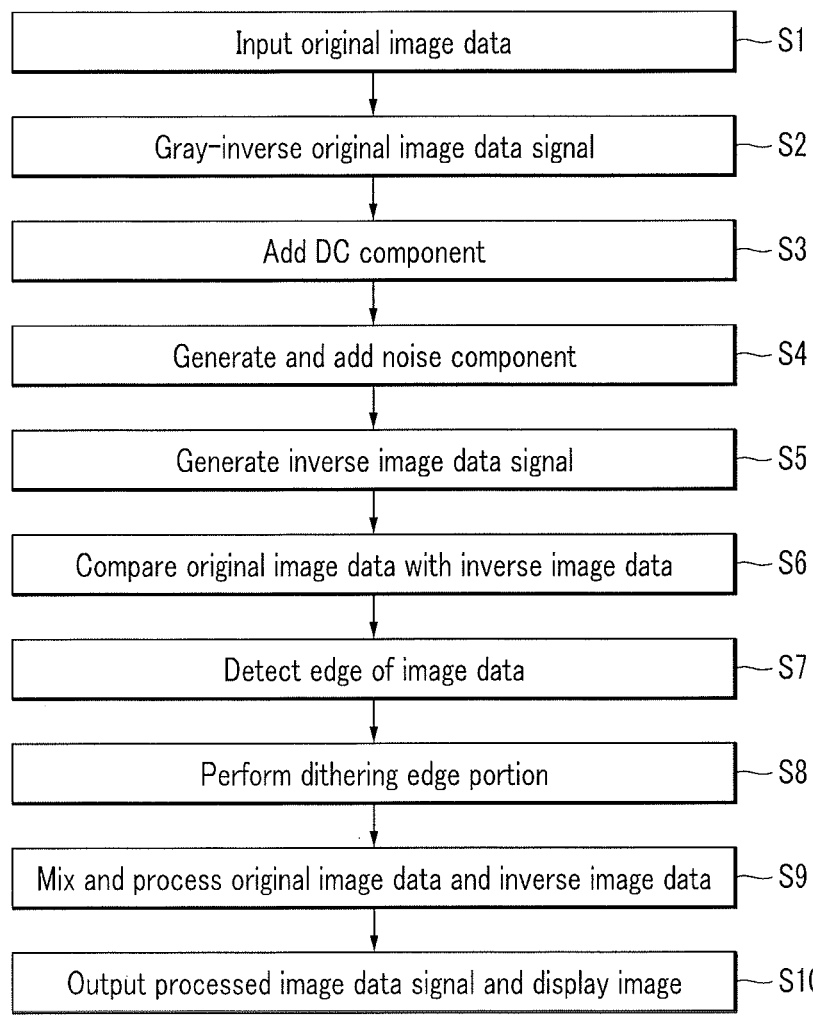
FIG. 6 is a flowchart of an image processing method of the display device according to the exemplary embodiment.

FIG. 6 is a flowchart of an image processing method of the display device according to an exemplary embodiment. In FIG. 6, for better understanding and ease of description, description will be limited to 2-dimensional image data.

FIG. 6 shows a process for processing an external input image signal according to the exemplary embodiment, outputting the processed signal through a data driver, and displaying.

First, original image data is input to the display device 10 from an external device (S1).

The original image data signal is directly transmitted to the controller, but it is transmitted to the inverse image processor to experience a series of processing steps for inverse image data processing. First, a luminance value with respect to the original image data signal is extracted, and an inverse luminance value is calculated by inverting a gray of the original image data signal (S2).

A random reference luminance value is added or subtracted with respect to the inverse luminance value to add a DC component (S3). Then, a luminance difference of an edge interface of an object of the displayed image is reduced so that an inverse image that can mask the original image can be realized. A luminance value calculated after addition of the DC component can be re-converted as a data value.

When a noise component is generated and added with respect to the converted pixel-specific data value, the inverse image data signal is generated (S4 and S5).

The original image data signal input in operation S1 and the inverse image data signal generated in operation S5 are mixed and processed in the controller. In this case, the original image data and the inverse image data can be compared with each other (S6).

Through the process of operation S6, a data signal corresponding to an edge interface of an object in the image data can be detected (S7).

In operation S7, dithering is performed on the data signal corresponding to the detected edge interface to thoroughly mask the original image (S8). Through the dithering process, a luminance deviation in the edge interface of the inverse image data signal can be reduced. Then, when a secured image data is displayed in the screen, visual detection of an edge portion in an overlapped image may be prevented or substantially minimized.

Next, the dithered original image data signal and inverse image data signal are mixed and processed to generate a secured image data signal (S9). In this case, the respective image data signals in the secured image data signal may be alternately arranged by each frame unit.

The processed secured image data signal output to the data driver is transmitted to the display unit and then a secured image is displayed (S10). The secured image is formed by overlapping the original image with the inverse image, so a viewer without the shutter spectacles 60 cannot recognize the original image. However, a user wearing the shutter spectacles 60 may see only the original data due to the opening and closing of the controller, so that security of the image data can be guaranteed.

According to example embodiments, a display device clearly displays a secure, e.g., private, image to a desired-user, so that displaying of private image contents can be protected. In addition, the new display device and method can transmit information by displaying an image only to users who need to recognize the image, so the actual user can conveniently view a secured image without a complex device or facility.

In contrast, a conventional flat panel display may include an optical shield plate or a controller to control viewing of information from a specific angle or a specific direction to secure a displayed image. However, such elements cannot completely shield the display screen, and a user of the flat panel display device may feel inconvenience using such a display device.

The referred drawings and the detailed description of the disclosed invention are only examples of the present invention and thus, are not used to restrict the meaning or limit the range of the present invention disclosed in the claims. Therefore, it will be understood that those skilled in the art may perform various modifications and equivalent embodiments from the description. Those skilled in the art can omit some of the constituent elements described in the present specification without deterioration in performance thereof or can add constituent elements to improve performance thereof. Further, those skilled in the art can modify the sequence of the steps of the method described in the present specification depending on the process environment or equipment. Therefore, the range of the present invention must be determined by the scope of the claims and the equivalent, not by the described exemplary embodiments.

<Description of symbols>

| | |
|---|---|
| 10: display unit | 20: scan driver |
| 30: data driver | 40: controller |
| 50: inverse image processor | 60: shutter spectacles |
| 70: pixel | |
| 401: data processor | 403: timing controller |
| 405: shutter spectacles controller | 501: gray inverter |
| 503: DC component adding unit | 505: noise generator |

What is claimed is:

1. A display device, comprising:
    a display unit including a plurality of pixels connected to a plurality of scan lines and a plurality of data lines;
    an inverse image processor to receive a first image data signal input from an external source and to generate a second image data signal based on the first image data signal;
    a controller to mix the first image data signal and the second image data signal alternately for each frame to generate a third image data signal, and to generate a driving control signal for opening and closing a pair of shutter spectacles for each image frame displayed in the display unit; and
    a data driver to receive the third image data signal from the controller and to apply a corresponding data voltage to each of the plurality of data lines, wherein:
    the inverse image processor performs a gray-inverting operation on the first image data signal to generate a gray-inverted image data signal, and performs a DC component adding operation on the gray-inverted image data signal to generate the second image data signal, wherein
    the DC component adding operation is selectively applied to a data signal corresponding to an edge portion of an object to be displayed.

2. The display device of claim 1, wherein the inverse image processor includes a gray inverter, the gray inverter to perform the gray-inverting operation by calculating an inverse luminance value having an inverse gray corresponding to a luminance value of the first image data signal and by converting luminance information of the first image data signal.

3. The display device of claim 2, wherein a sum of the luminance value and the inverse luminance value represents a luminance value of a maximum gray determined according to a number of bits representing a data value of the first image data signal.

4. The display device of claim 2, wherein the inverse image processor further comprises a DC component adding unit and a noise generator, the DC component adding unit to perform the DC component adding operation by adding or subtracting a luminance DC component, and the noise generator to perform a noise adding operation by generating and adding luminance noise.

5. The display device of claim 4, wherein the luminance DC component reduces a luminance difference of a data signal corresponding to an edge portion of an object to be displayed.

6. The display device of claim 4, wherein the luminance noise reduces a luminance difference of a data signal corresponding to an edge portion of an object to be displayed.

7. The display device of claim 1, wherein the controller includes a data processor to alternately mix the first image data signal and the second image data signal by each frame unit, to generate the third image data signal, and to transmit the third image data signal to the data driver.

8. The display device of claim 7, wherein the data processor is to perform a dithering operation to reduce a luminance difference of a data signal corresponding to an edge portion of an object to be displayed.

9. The display device of claim 1, wherein the controller includes a shutter spectacles controller to generate and transmit the driving control signal to the shutter spectacles, the driving control signal opening the shutter spectacles for a frame during which a first image corresponding to the first image data signal is displayed and closing the shutter spectacles for a frame during which a second image corresponding to the second image data signal is displayed.

10. The display device of claim 1, wherein:
the first image data signal includes a fourth image data signal and a fifth image data signal,
the second image data signal includes a sixth image data signal and a seventh image data signal, the sixth and seventh image data signals generated based on the fourth and fifth image data signals, respectively, and
the third image data signal is arranged by mixing the fourth image data signal, the fifth image data signal, the sixth image data signal, and the seventh image data signal.

11. The display device of claim 10, wherein the controller of the display unit is to generate the driving control signal of the shutter spectacles to open a left-eye shutter of the shutter spectacles, while a fourth image corresponding to the fourth image data signal is displayed, and open a right-eye shutter of the shutter spectacles, while a fifth image corresponding to the fifth image data signal is displayed.

12. The display device of claim 11, wherein the driving control signal of the shutter spectacles includes:
a left-eye shutter control signal for opening the left-eye shutter of the shutter spectacles, while the fourth image corresponding to the fourth image data signal is displayed; and
a right-eye shutter control signal for opening the right-eye shutter of the shutter spectacles, while the fifth image corresponding to the fifth image data signal is displayed.

13. The display device of claim 11, wherein the driving control signal of the shutter spectacles is for closing the left-eye shutter and the right-eye shutter of the spectacles, while sixth and seventh images corresponding to the sixth and seventh image data signals, respectively, are displayed.

14. The display device of claim 1, wherein the controller includes a timing controller to generate and transmit a control signal for controlling driving of the display unit and the data driver according to a synchronization signal input from the external source.

15. The display device of claim 1, wherein the inverse image processor performs a noise adding operation on an DC component adding image data signal generated by the DC component adding operation to generate the second image data signal.

16. A display system, comprising:
a data processor to generate a third image data signal formed by alternately mixing a first image data signal and a second image data signal by each image frame, the first image data signal input from an external source, and the second image data signal generated based on the first image data signal;
a display unit including a plurality of pixels displaying an image by emitting light with a driving current corresponding to the third image data signal;
an inverse image processor to receive the first image data signal and to generate the second image data signal based on the first image data signal, the inverse image processor performing a gray-inverting operation on the first image data signal to generate a gray-inverted image data signal, and performing a DC component adding operation on the gray-inverted image data signal to generate the second image data signal;
a pair of shutter spectacles to open and close by each image frame unit displayed in the display unit to control transmission of the displayed image; and
a shutter spectacle controller to generate a driving control signal controlling opening and closing of the shutter spectacles and transmitting the driving control signal to the shutter spectacles, wherein
the DC component adding operation is selectively applied to a data signal corresponding to an edge portion of an object to be displayed.

17. The display system of claim 16, wherein the inverse image processor performs the gray-inverting operation by calculating an inverse luminance value having an inverted gray corresponding to a luminance value of the first image data signal and by converting luminance information of the first image data signal.

18. The display system of claim 16, wherein the inverse image processor comprises a DC component adding unit and a noise generator, the DC component adding unit to perform the DC component adding operation by adding or subtracting a luminance DC component, and the noise generator to perform a noise adding operation by generating and adding luminance noise.

19. The display system of claim 16, wherein the data processor is to perform a dithering operation to reduce a luminance difference of a data signal corresponding to an edge portion of an object to be displayed.

20. The display system of claim 16, wherein the driving control signal is for opening the shutter spectacles for a frame during which a first image corresponding to the first image data signal is displayed, and is for closing the shutter spectacles for a frame during which a second image corresponding to the second image data signal is displayed.

21. The display system of claim 16, wherein:
the first image data signal includes a fourth image data signal and a fifth image data signal,
the second image data signal includes a sixth image data signal and a seventh image data signal, the sixth and seventh image data signals generated based on the fourth and fifth image data signals, respectively, the third image data signal includes a sequence of the fourth image data signal, the sixth image data signal, the fifth image data signal, and the seventh image data signal, and the shutter spectacles controller is to open a left-eye shutter of the shutter spectacles, while a fourth image corresponding to the fourth image data signal is displayed, and is to open a right-eye shutter of the shutter spectacles, while a fifth image corresponding to the fifth image data signal is displayed.

22. The display system of claim 21, wherein the driving control signal of the shutter spectacles includes:

a left-eye shutter control signal for opening the left-eye shutter of the shutter spectacles, while a fourth image corresponding to the fourth image data signal is displayed; and a right-eye shutter control signal for opening the right-eye shutter of the shutter spectacles, while a fifth image corresponding to the fifth image data signal is displayed.

23. The display system of claim 21, wherein the driving control signal of the shutter spectacles is for closing the left-eye shutter and the right-eye shutter of the shutter spectacles, while sixth and seventh images corresponding to the sixth and seventh image data signals, respectively, are displayed.

24. An image processing method of a display device, the method comprising:

receiving a first image data signal from an external source;

generating a second image data signal based on the first image data signal;

detecting a data signal corresponding to an edge portion of an object to be displayed and performing a dithering operation to reduce a luminance difference of the data signals corresponding to the edge portion of the object;

performing a gray-inverting operation on the first image data signal to generate a gray-inverted image data signal, and performing a DC component adding operation on the gray-inverted image data signal to generate the second image data signal;

generating a third image data signal by alternately mixing the first image data signal and the second image data signal by each frame unit; and outputting the third image data signal to a plurality of pixels of a display unit, wherein the DC component adding operation is selectively applied to a data signal corresponding to an edge portion of an object to be displayed.

25. The image processing method of the display device of claim 24, wherein the gray-inverting operation is performed by calculating an inverse luminance value having an inverted gray corresponding to the first image data signal and converting luminance information of the first image data signal.

26. The image processing method of the display device of claim 24, further comprising performing a noise adding operation to generate the second image data signal, wherein:

the DC component adding operation is performed by adding and subtracting a luminance DC component, and the noise adding operation is performed by generating and adding a luminance noise.

27. The image processing method of the display device of claim 24, wherein:

the first image data signal includes a fourth image data signal and a fifth image data signal, the second image data signal includes a sixth image data signal and a seventh image data signal, the sixth and seventh image data signals generated based on the fourth and fifth image data signals, respectively, and the third image data signal is arranged by mixing the fourth image data signal, the fifth image data signal, the sixth image data signal, and the seventh image data signal.

* * * * *